United States Patent [19]

Delvy et al.

[11] 4,443,829
[45] Apr. 17, 1984

[54] CAPACITOR WITH INTEGRAL DISCHARGE RESISTOR AND METHOD OF MANUFACTURE

[75] Inventors: Robert J. Delvy, Bridgeport; Harry L. Pentecost, Monroe; Leroy R. Patterson, Guilford, all of Conn.

[73] Assignee: Universal Manufacturing Corp., Paterson, N.J.

[21] Appl. No.: 440,096

[22] Filed: Nov. 8, 1982

[51] Int. Cl.³ .......................... H01G 1/11; H01G 4/38
[52] U.S. Cl. ................................. 361/275; 29/25.42
[58] Field of Search ............... 29/25.42; 361/275, 306, 361/308, 309, 311, 323

[56] References Cited

U.S. PATENT DOCUMENTS

| | | | |
|---|---|---|---|
| 1,952,925 | 3/1934 | Kopinski | 29/25.42 X |
| 2,842,653 | 7/1958 | Clemons | 29/25.42 X |
| 2,858,492 | 10/1958 | Lamphier | 29/25.42 X |
| 3,034,198 | 5/1962 | Rayburn et al. | 29/25.42 |
| 3,840,787 | 10/1974 | Grahame | 361/275 |
| 4,028,595 | 6/1977 | Stockman | 29/25.42 X |
| 4,368,407 | 1/1983 | Wroblewski | 29/25.42 X |

FOREIGN PATENT DOCUMENTS 744480 2/1944 Fed. Rep. of Germany ...... 361/275

Primary Examiner—Donald A. Griffin
Attorney, Agent, or Firm—Darby & darby

[57] ABSTRACT

In a capacitor of the wound metallized dielectric type, a section of resistive material is provided on a film forming the metallized dielectric, and this resistive material extends across the film's entire width (the axial dimension of the capacitor). A metal contact for one of the capacitor plates is sprayed on either end of the capacitor so as to touch one end of the section of resistive material, thereby creating a resistive shunt across the plates formed on the metallized film. The section of resistive material is preferably carbon-loaded paper which is secured over an unmetallized area to the film used to make the capacitor. The paper projects beyond either lateral edge of the film so that spraying metal on the ends of the capacitor causes the ends of the paper to be connected to respective capacitor plates.

16 Claims, 8 Drawing Figures

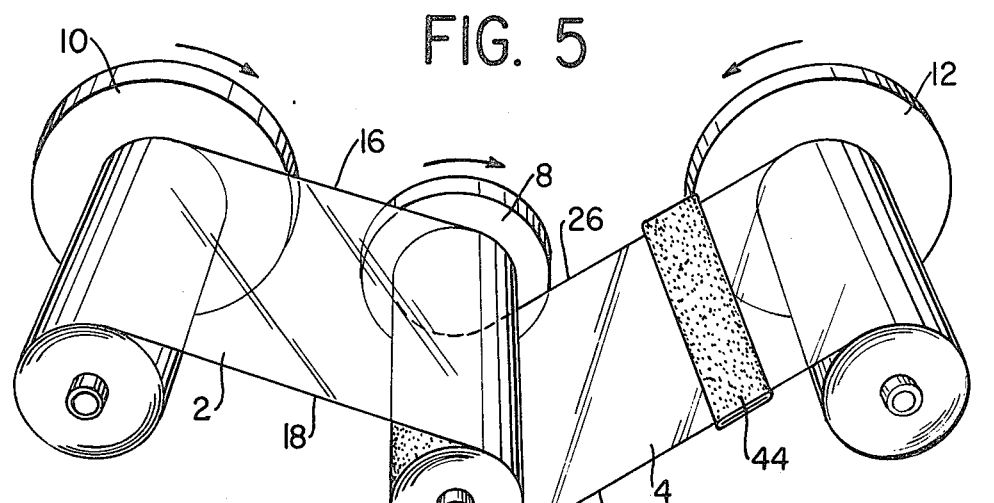
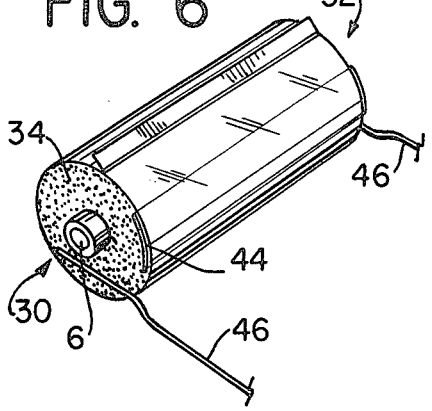
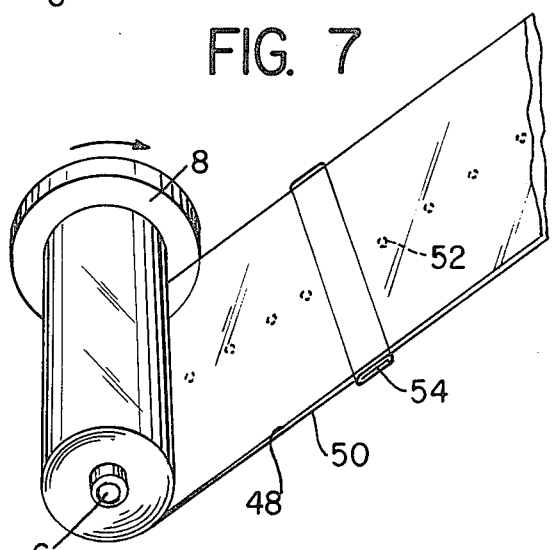
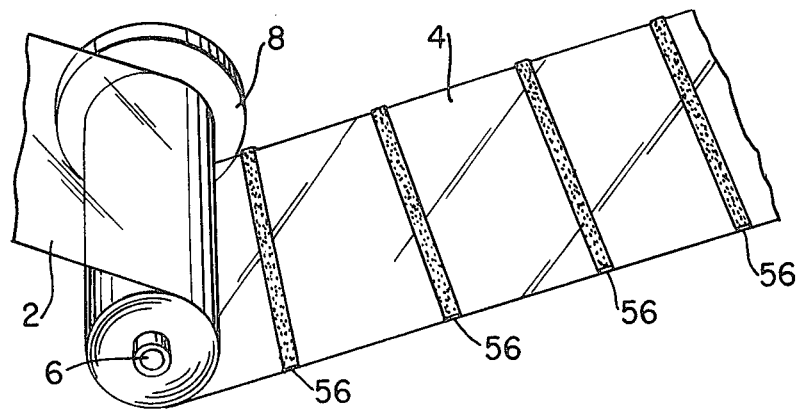

CAPACITOR WITH INTEGRAL DISCHARGE RESISTOR AND METHOD OF MANUFACTURE

The invention pertains to capacitors, and more particularly to capacitors of the wound metallized dielectric type.

BACKGROUND OF THE INVENTION

It is known to use a ballast capacitor in lighting applications. If a discharge lamp ballast capacitor does not have a discharge resistor connected across its plates, a charge may be left across the capacitor after the lamp has been turned off. This can be a safety hazard for service personnel. To minimize this safety hazard, Underwriters Laboratories requires that lamp ballast capacitors be equipped with a discharge resistor which will reduce the voltage across the capacitor to 50 volts or less within one minute after power has been turned off.

Where no other suitable impedance is connected with a capacitor within a unit, it is a known practice to provide such a capacitor with a discharge resistor connected across its plates. One unit of this type uses a metal can to which a metal cover is attached. The cover supports two external electrodes for the capacitor, and a discrete discharge resistor is connected between these electrodes. The discharge resistor can be made of carbonloaded paper, or some other conductor/substrate arrangement.

In this and other known devices, the discharge resistor is a discrete unit and must be added to the unit during a separate manufacturing step which requires manual labor. Significant economics could be realized by eliminating such labor-intensive procedures.

Broadly, it is an object of the present invention to produce a discharge lamp ballast capacitor unit having a discharge resistor and to provide a method for manufacturing the same which avoids the shortcomings of the prior art. It is specifically intended that labor intensive manufacturing procedures for incorporating the resistor in the capacitor unit be eliminated.

It is another object of the present invention to provide an integral discharge resistor in a discharge lamp ballast capacitor.

It is yet another object to provide an integral discharge resistor in a discharge lamp ballast capacitor of the wound metallized dielectric type.

It is a further object to provide an effective method for manufacturing a capacitor of the wound metallized dielectric type in such a manner as to provide an integral discharge resistor.

It is also an object of the present invention to provide a capacitor of the type described which is relatively simple and inexpensive in construction, yet reliable and convenient in use and easy to manufacture.

These objects, among others which will be discussed hereinafter, are achieved in a preferred form of the invention, by providing, in a capacitor of the type employing wound metallized dielectric (preferably a metallized film) type, a section of resistive material which extends across the entire width of the film (the axial dimension of the capacitor). A metal contact for one of the capacitor plates (formed by the metallization) is sprayed on either end of the capacitor so as to touch one end of the section of resistive material, thereby creating a resistive shunt across the plates formed on the metallized film.

Advantageously, the section of resistive material is carbon-loaded paper which is secured to the film used to make the capacitor over an unmetallized area. The paper projects beyond either lateral edge of the film so that spraying metal on the ends of the capacitor causes the ends of the paper to be connected to respective capacitor plates.

Because the section of resistive material can be wound into the capacitor as part of the normal winding process, the expense of manufacturing the capacitor with an integral discharge resistor is very low.

The section of resistive material may alternatively be incorporated in a laminated wrapper which is wrapped around the capacitor after winding of the plates has been completed and prior to metal spraying. Also the single section of resistive material may be replaced by a plurality of circumferentially spaced sections all connected in parallel.

BRIEF DESCRIPTION OF THE DRAWINGS

The foregoing brief description and further object, features and advantages of the present invention will be more completely understood from the following detailed description of presently preferred, but nonetheless illustrative, embodiments of the invention with reference being had to the drawing, in which:

FIG. 5 is a view similar to FIG. 1 showing one preferred embodiment for practicing the method of the present invention;

FIG. 6 shows a completed capacitor embodying the invention;

FIG. 7 shows an alternate embodiment for practicing the method of the invention;

FIG. 8 shows yet another embodiment for practicing the method aspect of the invention.

DETAILED DESCRIPTION OF PREFERRED EMBODIMENTS

Figure 1:
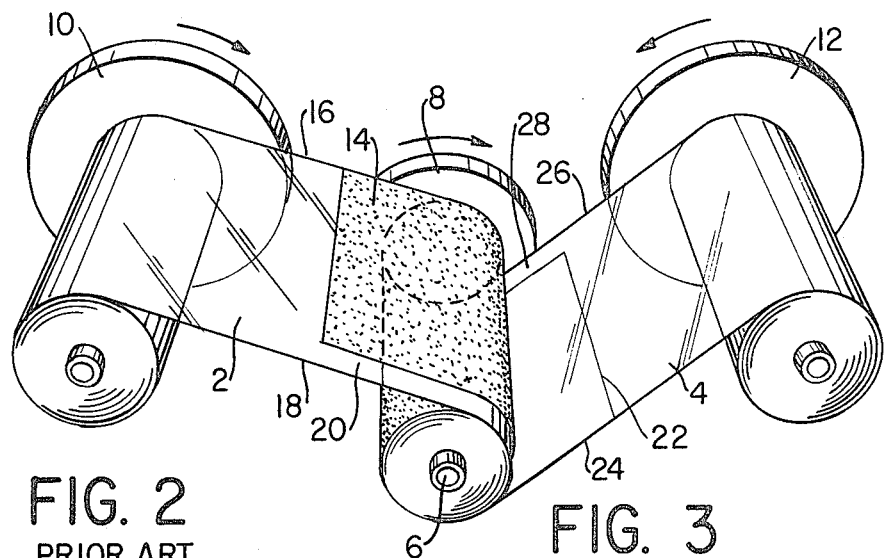
FIG. 1 schematically illustrates the assembly process of a conventional wound, metallized dielectric capacitor.

FIG. 1 illustrates the manufacture of a known type of capacitor. First and second sheets or strips 2, 4 of a metallized insulating film are shown being wound, in convoluted layers, upon a central hollow cylindrical core 6, which is rotated by a winding bobbin 8. The strips 2, 4 are drawn off respective supply reels 10, 12. Strip 2 is metallized with a conductor forming one plate of the capacitor at its region 14. Region 14 extends all the way to edge 16, but is inset from and parallel to edge 18. The region 20 located between region 14 and edge 18 of strip 2 is known as a "margin".

Strip 4 is likewise metallized, forming a second plate of the capacitor, at its region 22, which extends all the way to edge 24 but is parallel to and inset from edge 26. There is thus a margin 28 between region 22 and edge 26. As shown, margin 28 and margin 20 are opposite lateral edges of the strips 2, 4 and will be disposed at opposite ends of the finished capacitor. Furthermore, region 22 is located on that surface of strip 4 which does not touch strip 2 so that metallized regions 14 and 22 are insulated from each other by strip 4.

Figure 2:
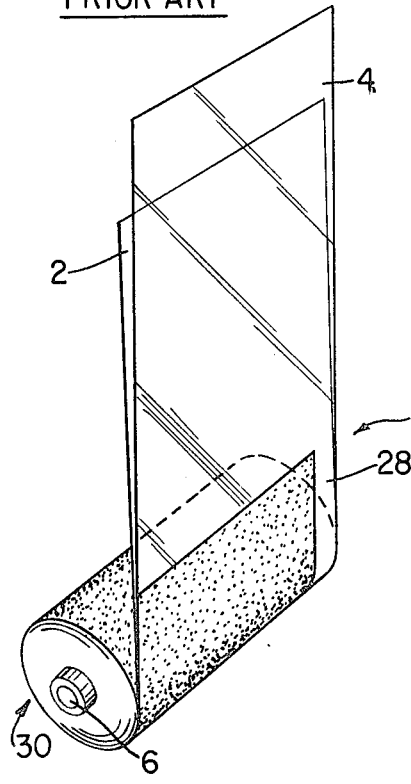
FIG. 2 shows the conventional capacitor prior to completion of wrapping.
Figure 3:
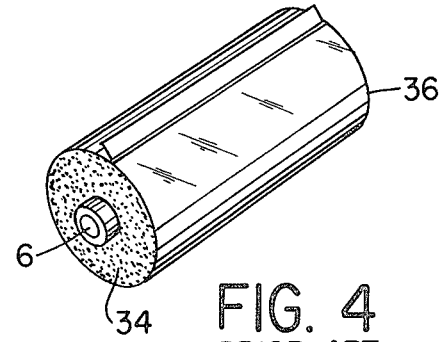
FIG. 3 shows the conventional capacitor after wrapping and metal spraying at the ends.

As can be seen in FIGS. 2 and 3, the outermost ends of strips 2 and 4 are completely unmetallized. The capacitor is finished by wrapping the ends of strips 2 and 4 perhaps five turns around the completed unit and securing the ends, preferably by adhesive or heat-sealing. This forms a cylindrical capacitor with annular ends 30 and 32.

After wrapping, the ends 30 and 32 are sprayed or otherwise coated with molten metal, which adheres to the metallization on strips 2 and 4: metal layer 34 and 36 adhere to the metallization in region 22 and 14, respectively. The capacitor plates (metallization layers) are not short-circuited together at either end 30 or 32, because margins 20 and 28 prevent one layer of metal from touching both plates of the capacitor at the same time.

Figure 4:
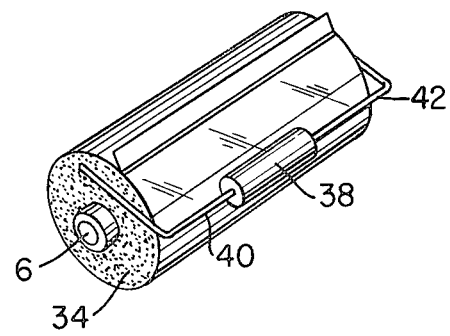
FIG. 4 shows the conventional capacitor with a discrete discharge resistor secured across it.

Layer 34 serves as a terminal to which a lead can be soldered to establish an electrical connection with the plate formed by the metallized region 22, and layer 36 similarly permits a connection with the metallized region 14. To provide the capacitor with a discharge resistor in the prior art, the leads 40 and 42 of a discrete resistor 38 (FIG. 4) were soldered to or otherwise electrically connected to layers 34 and 36, respectively.

FIG. 5 shows the winding apparatus of FIG. 1, with the winding process further advanced and all of the metallized parts of strips 2 and 4 (i.e. the plates) wound onto the core 6. On the radially inward surface of strip 4, there is placed a section of electrically resistive material, which in this example is an elongated rectangular piece 44 of carbon-loaded paper. It will be understood that other materials and different shapes can be used. The dimensions of piece 44 and the density of its carbon-loading determine its resistance. It is preferred that the ends of piece 44 project beyond edges 24 and 26 by between 10 and 60 mils to facilitate effective connection to piece 44 during the process of coating the capacitor ends with conductive material.

Although piece 44 is shown placed on the radially inward surface, and near the outermost end region of strip 4, it can be placed anywhere on strip 2 or 4 as long as it touches neither of the plates i.e. neither of the metallized regions 14 or 22. As shown, piece 44 will be wound into the capacitor and subsequently covered by unmetallized film (see FIG. 6) but this only facilitates mechanical protection of piece 44 and not electrical operation. The embodiment shown in FIG. 6 is an integral unit to which leads 46 can be connected; the resistor, in the form of piece 44, is connected across the plates when ends 30 and 32 are sprayed with metal.

In the preceding example, piece 44 is mounted to one of the strips which is actually used in making the capacitor. This need not be the case: a separate wrapper may be used. This is shown in FIG. 7. This shows two laminated strips 48 and 50 which are heat-welded together at spots 52 to form a sandwich enclosing a strip 54 of resistive material. However, those skilled in the art will appreciate that the resistive material may be secured to or within the wrapper by any known means. Also, the separate winding need not be wound on the outside of (on top of) the layers forming the capacitor. The wrapper may, in fact, be radially inward of the other layers (e.g., directly over the core 6), or the strip of resistive material may be formed directly on the core 6.

As a further alternative, instead of one strip, such as strip 44 forming the discharge resistor, there may be a plurality of smaller strips 56 such as as are shown in FIG. 8. Electrically, this is the equivalent of a plurality of small resistors placed in parallel with each other to form the equivalent of a single large resistor. The alternative shown in FIG. 8 has the advantage that it permits maximum contact between the discharge resistor formed by strips 56 and the plates of the finished capacitor. It also provides improved reliability, because a localized defect on one of the strips can only affect one of the small resistors, the discharge resistor, as a whole, remaining substantially unaffected.

Although preferred forms of the invention have been disclosed for illustrative purposes, those skilled in the art will appreciate that many additions, modifications and substitutions are possible without departing from the scope and spirit of the invention as defined in the accompanying claims. For example, it is not necessary to use a discreet conductive element which is wound into the capacitor during manufacture. Alternatively, the resistive material can be deposited directly on one of the strips of film. However, it is important that the resistive element be within the wound capacitor layers prior to the step of metal spraying the ends of the capacitor with molten metal.

What is claimed is:

1. A capacitor with an integral discharge resistor, comprising:
    a sheet of electrically insulating material having first and second outer edges;
    first and second sheets of electrically conductive material in spaced, opposed relationship, said electrically insulating sheet being disposed therebetween, said first conductive sheet extending outwardly at least up to said second edge, there being provided a non-conductive margin along said first edge at which said first electrically conductive sheet cannot be contacted, said second conductive sheet extending outwardly at least to said first edge, there being provided a second non-conductive margin along said second edge at which electrical contact cannot be made with said second conductive sheet;
    at least one section of electrically resistive material mounted in spaced relationship from said first and second conductive sheets and extending between and, at least, to said first and second edges;
    first connecting means disposed at said second edge for providing an electrical connection between said first conductive sheet and one end of said section of resistive material;
    second connecting means disposed at said first edge for providing an electrical connection between said second conductive sheet and the other end of said section of resistive material.

2. A capacitor in accordance with claim 1 wherein said first non-conductive margin is created by terminating said first electrically conductive sheet at a position inward of said first edge and said second non-conductive margin is created by terminating said second electrically conductive sheet at a position inward of said second edge.

3. A capacitor in accordance with claim 1 wherein said section of resistive material is in the form of an elongated member mounted on a surface of such sheet of electrical insulating material in spaced relationship to one of said sheets of electrically conductive material on the same surface.

4. A capacitor as in claim 1 wherein at least one of said connecting means includes a conductive coating disposed at a respective one of said first and second edges and covering a portion of the respective conductive sheet and a respective end of said resistive material.

5. A capacitor in accordance with claim 1 wherein said section of resistive material comprises a plurality of substantially parallel elongated members disposed on a surface of said sheet of electrically insulating material in spaced relationship from each other and from a sheet of electrically conductive material disposed on the same surface, each member being connected through one of said connecting means to a respective electrically conductive sheet and through the other connecting means to the other electrically conductive sheet.

6. A capacitor in accordance with any preceding claim wherein said sheet of electrically insulating material is in the form of an elongated strip having its width defined by said first and second edges, the capacitor being formed substantially into the shape of a cylinder by repeatedly winding said strip into convoluted layers.

7. A capacitor in accordance with claim 6 wherein at least one of said electrically conductive sheets comprises a metallic coating on the surface of said sheet of insulating material.

8. A capacitor in accordance with claim 7 further comprising a second elongated strip of insulating material in juxtaposed relationship with said sheet of electrically insulating material, one of said sheets of electrically conductive material being disposed therebetween.

9. A capacitor in accordance with claim 8 wherein at least one of said sheets of electrically conductive material is a metalized coating on one of said strips of insulated material.

10. A capacitor in accordance with claim 9 wherein each of said sheets of electrically insulating material is a metalized coating formed on a difference one of said strips of electrically insulating material.

11. A capacitor in accordance with claim 10 wherein the section of resistive material is disposed on an elongated, unmetalized region on one of said strips of electrically insulating material, the portion of said strip including said region being wrapped around previously formed layers of said capacitor to form an outer wrapping.

12. A wrapping for providing an integral discharge resistor in a capacitor of the type formed by winding an elongated strip of sheet material into convoluted successive layers, said strip of sheet material comprising juxtaposed, electrically conductive layers with an electrically insulating layer interposed therebetween, said wrapping comprising an elongated strip of insulating material having a width substantially equal to the length of said capacitor, and a section of resistive material secured so as to extend across the width of said insulating material strip and to extend at least to the lateral limits thereof, said wrapping being coaxially wound in successive, convoluted layers with respect to said capacitor.

13. A wrapping in accordance with claim 12 which is coaxially wound in successive, convoluted layers over said capacitor.

14. A method for manufacturing a capacitor in accordance with claim 6 comprising the steps of securing said section of resistive material on said sheet of electrically insulating material so as to extend between said first and second edges in a region thereof removed from said electrically conductive sheets, winding said strip into successive convoluted layers about the axis generally perpendicular to said first and second edges, and applying a conductive coating to the ends of the cylindrical shape resulting from winding said strip.

15. A method for forming an integral discharge resistor on a capacitor of the type formed by winding a strip of sheet material into consecutive convoluted layers, said method being performed with the aid of a separate wrapping comprising at least one strip of insulating material having a width substantially equal to the length of said capacitor and a resistive member mounted on said insulating material strip so as to extend across the width thereof, said method comprising the step of winding said one strip into consecutive, convoluted layers with respect to said capacitor, and coating the ends of the resulting structure with an electrically conductive material so as to electrically connect said resitive member to said capacitor.

16. The method of claim 15 wherein said one strip is wrapped over said capacitor.

* * * * *